US005533245A

United States Patent [19]

Stanton

[11] Patent Number: 5,533,245

[45] Date of Patent: Jul. 9, 1996

[54] RELEASABLE VALVE SEAT REMOVAL TOOL

[76] Inventor: Eddie Stanton, 2025 Magill, Odessa, Tex. 79764

[21] Appl. No.: 324,785

[22] Filed: Oct. 18, 1994

[51] Int. Cl.[6] .......................... B23P 19/04

[52] U.S. Cl. .......................... 29/221.6; 29/213.1; 29/263; 29/265

[58] Field of Search .......................... 29/213.1, 221.6, 29/263, 265, 282, 890.124, 280, 214, 261, 262; 279/2.12; 269/48.1

[56] References Cited

U.S. PATENT DOCUMENTS

| | | | |
|---|---|---|---|
| 229,325 | 6/1880 | Luther . | |
| 314,243 | 3/1885 | Heathcote . | |
| 813,384 | 2/1906 | Kiefer . | |
| 1,492,877 | 5/1924 | Davis . | |
| 1,517,883 | 12/1924 | Alleman . | |
| 1,553,171 | 9/1925 | Jones . | |
| 1,570,338 | 1/1926 | Davis . | |
| 1,598,887 | 9/1926 | Smith . | |
| 1,650,023 | 11/1927 | Maxwell . | |
| 1,650,024 | 11/1927 | Maxwell . | |
| 1,652,857 | 12/1927 | Greve . | |
| 1,958,330 | 5/1934 | Beard . | |
| 2,036,665 | 4/1936 | White et al. . | |
| 2,098,134 | 11/1937 | Cook et al. | 29/265 |
| 2,755,540 | 7/1956 | Crozier | 29/265 |
| 2,847,752 | 8/1958 | Simmons | 29/213.1 |
| 2,924,005 | 2/1960 | Wilson et al. | 29/262 |
| 3,029,501 | 4/1962 | Leathers . | |
| 3,479,722 | 11/1969 | Maness | 29/213.1 |
| 3,645,328 | 2/1972 | Greene, Jr. . | |
| 3,990,139 | 11/1976 | Touchet . | |
| 4,068,879 | 1/1978 | Torbet et al. . | |
| 4,507,837 | 4/1985 | Hinkle | 29/265 |
| 4,916,792 | 4/1990 | Haubus | 29/263 |

FOREIGN PATENT DOCUMENTS

| | | |
|---|---|---|
| 505748 | 8/1930 | Germany . |
| 0070950 | 7/1981 | Germany . |
| 403230 | 11/1965 | Switzerland . |
| 1172860A | 12/1983 | U.S.S.R. . |

*Primary Examiner*—Robert C. Watson
*Attorney, Agent, or Firm*—Crutsinger & Booth

[57] ABSTRACT

A releasible tool is provided for removing a cylindrical member such as a valve seat, a pump liner, or a bushing from machines, pumps, oil well tubing, or other devices in which it is used. The releasable tool includes a mandrel, a platform slidably mounted to the mandrel, at least two jaws pivotally mounted to the platform, and an adaptor connected to the mandrel. The mandrel has a generally bell-shaped lower end and a shank portion. The platform is slidably mounted on the shank portion of the mandrel by placing the shank portion through a central bore of the platform. The jaw members are pivotally mounted to the platform, whereby they can be pivotally deflected outward to an expanded position by the bell-shaped lower end of the mandrel when the platform slides down the shank portion. The adaptor is releasably connected to the upper end of the shank portion of the mandrel. The adaptor and platform have corresponding tapered surfaces that can be engaged to form a releasable interference fit to grab and slide the platform upward relative to the shank portion of the mandrel, which moves the jaw members away from the bell-shaped lower end of the mandrel so that they can be pivotally deflected inward to a retracted position. Thus, the tool can be selectively inserted into or removed from a cylindrical member.

8 Claims, 3 Drawing Sheets

RELEASABLE VALVE SEAT REMOVAL TOOL

TECHNICAL FIELD

This invention relates to devices and methods for removing valve seats, pump liners, bushings, and similar cylindrical members from machines, pumps, or other devices in which they are used, the same being described herein as applied to a valve seat for a pump.

BACKGROUND OF THE INVENTION

The typical fluid pump has a pump body defining a pumping chamber with a suction port, plunger port, and discharge port. A suction valve is positioned in the suction port, a reciprocating plunger is positioned in the plunger port, and a discharge valve is positioned in the discharge port.

The suction valve is usually a spring-loaded check valve for allowing the flow of fluid from the low pressure side of the pump through the suction port into the pumping chamber while preventing the backflow of fluid through the suction port. The discharge valve is usually a spring-loaded check valve for allowing the flow of fluid from the pumping chamber through the discharge port to the high pressure side of the pump while preventing the backflow of fluid through the discharge port.

The typical spring-loaded check valve used in the suction and discharge ports of a fluid pump has a valve seat. The suction and discharge ports of a typical fluid pump are generally cylindrical openings into the pumping chamber. Thus, the valve seat has a generally cylindrical configuration with a central bore therethrough and is symmetrical about a central axis. The valve seat has a slightly tapered outer surface (male) which mates with a similarly slightly tapered inner surface (female) of the port to create an pressure-tight interference fit. Typically, the suction and discharge valves are vertically disposed in the pump, that is, the axis of the cylindrical valve seat is vertically oriented in the pump body, preferably such that the vertical axes of the valve seats of suction and discharge valves are co-axially aligned.

The typical valve seat has a frusto-conical shaped seat portion formed on one end thereof that is adapted to seat a flange portion on a valve element that reciprocates in the bore of the valve seat. The same end of the valve seat has exposed male threads formed thereon so that a cage having corresponding threads can be threaded onto the valve seat to capture a spring and valve element adjacent the valve seat. Thus, the valve element is spring-loaded in the valve seat in a normally closed position. When a fluid pressure differential across the check valve exerts a force on the valve element in a direction opposed to the closing force exerted by the spring and that is sufficient to overcome the spring, then the spring-loaded valve element moves against the spring to open the check valve and allow fluid therethrough. But if a fluid pressure differential across the check valve exerts a force on the valve element in the same direction as the closing force exerted by the spring, then the spring-loaded valve element is pressured more tightly closed. Thus, the check valve only allows fluid to flow therethrough in one direction.

The plunger of the pump is positioned to reciprocate back and forth in the plunger port. During the back stroke of the plunger, the increasing volume of the pumping chamber creates decreasing fluid pressure or suction in the chamber, which opens the suction valve in the suction port to draw fluid into the pumping chamber. During the forward stroke of the plunger, the decreasing volume of the pumping chamber creates increasing fluid pressure in the chamber, which closes the suction valve and opens the discharge valve in the discharge port to pump fluid through the discharge valve to the high pressure side of the pump.

During operation of the pump the valve seat becomes worn and must be periodically replaced due to the repeated reciprocation of the valve element and the fluid flow. Particularly when pumps are used for materials containing mud, sand, or other gritty or abrading materials, as in oil wells, the wear upon the walls of the valve seat about the valve element is so rapid as to speedily render the pumps unfit for service unless the surfaces are frequently renewed.

But during operation of the pump the hammering action of the spring-loaded valve element and the high pressures tends to wedge the valve seat in an extremely tight interference fit with the inner surface of the port in the pump body. Sometimes the valve seat becomes deformed and rusts in place. For these and additional reasons, the valve seat can become extremely difficult to remove. Thus, there are many prior art devices for pulling the valve seat from the pump body that attempt to solve this problem of removing the valve seat with varying degrees of success.

Typically, a valve seat removing tool is a tapered mandrel that receives a pair of jaws. The jaws have a complimentary, tapered central passageway and it is a common practice to hold the jaws biased inwardly with an O-ring or the like. The valve removing tool is run through the interior of the valve whereupon the jaw shoulders engage the bottom face of the valve seat and then the tool is set by moving the mandrel respective to the jaws. Hydraulic jacking or knocking devices are used to urge the tool away from the pump body and thereby force the worn valve seat from the pump body.

But occasionally the valve seat cannot be forced from the pump body, which causes a dilemma because the prior art removing tool has been firmly set in the valve and cannot be retrieved unless it brings the valve seat out of the pump body. Accordingly, expensive pump tear-down may be required in order to retrieve the captured valve seat removing tool and thereafter use other more expensive means of removing the valve seat from the pump.

For example, U.S. Pat. No. 3,990,139 issued Nov. 9, 1976 to Daniel Lee Touchet discloses a valve seat puller utilizing a plurality of J-shaped hooks mounted for limited pivotal movement on a hook support block. The hook support block and J-shaped hooks are supported by a threaded rod extending through a central aperture in the support block and secured in place by a lock nut. The J-shaped ends of the hooks are spread to engage the lower rim of the valve seat. The threaded rod passes through an aperture in a pump support plate spaced above the hook support block and is secured to the pump support plate by a drive nut. By applying rotary motion to the rod or the drive nut, the rotary motion will be translated into vertical axial motion of the rod, thus applying a lifting force to the hooks and valve seat to free the seat. But this device does not contemplate the problem of when the valve seat remains fully stuck despite all efforts to remove it, in which case this valve puller also becomes irretrievably stuck in the pump, thereby compounding the service problem.

U.S. Pat. No. 1,652,857 issued Dec. 31, 1927 to Edgar E. Greve discloses a device for removing valve seats. The device includes a cross-bar through the center of which is slidably passed the threaded upper end of a mandrel. Above the cross-bar on the threaded upper end of the mandrel is an operating nut by means of which the mandrel may be raised and lowered. The lower portion of the mandrel, below the threaded area thereof, is squared, and below the squared portion the mandrel is flared to provide oppositely inclined faces. Slidably fitted over the squared portion is a transverse adjusting bar having laterally projecting lugs to provide pivotal suspension of dogs. The inner faces of the dogs are constructed so as to provide large contacting surface with the inclined faces of the mandrel. The lower end of each of the dogs terminates in a lip or ledge. The under faces of the dogs are rounded and they are so balanced that they have a tendency to swing in toward each other when hanging free of the tapered faces of the mandrel. Once passed through the valve seat, the mandrel is lifted to move the dogs away from each other, forcing the ledges or lips under the valve seat. By turning the nut, the mandrel may be gradually raised to attempt to lift the valve seat. But typical of the problem with prior art devices, if the valve seat refuses to budge, there is no way to lift the tool without having the inclined faces of the mandrel force the dogs away from each other such that the ledges or lips engage the valve seat.

U.S. Pat. No. 1,650,023 issued Nov. 22, 1927 to Raymond F. Maxwell, discloses a tool for removing the liner for a pump. The liner removing tool has a ring-like threaded portion from which project opposite pairs of lugs. From each pair of lugs is pivoted the upper end of a grappling dog. At the lower part of their side edges, the grappling dogs are provided with outwardly projecting shoulders for engaging the lower end of the cylindrical liner. Extending through the ring-like threaded portion is an operating bolt, the lower end of which has a disk. The confronting edges of the grappling dogs are curved inwardly towards each other and the edges are adapted for engagement with the disc. The bolt is turned to move the disk into the wide part of the space between the confronting edges of the grappling dogs to collapse the dogs so that they may be inserted through the liner. The liner removing tool is thrust through the liner until the projecting shoulders on the dogs pass beyond the inner end of the liner. When the bolt is turned in the opposite direction, the bolt moves the disk to a narrower space between the confronting edges of the grappling dogs to force the dogs to move outwardly. But if the liner cannot be removed, turning the bolt may not move the disk back to the wide part of the space between the confronting edges of the grappling dogs because once the tool is loosened from the liner, the ring-like threaded portion may rotate freely with the rotation of the bolt so that the bolt and disk do not move further relative to the dogs. Thus, the grappling dogs may not collapse inwardly, thereby preventing the liner removing tool from being removed.

Thus there has been a long-felt need for a simple valve seat removing tool that is capable of removing tightly wedged valve seats, but that can also be released if the valve seat cannot be removed from the pump body.

SUMMARY OF THE INVENTION

According to the invention, a releasible tool is provided for removing a cylindrical member with a bore therethrough such as a valve seat, a pump liner, or a bushing from machines, pumps, oil well tubing, or other devices in which it is used. Although the device and method of the present invention can be adapted for pulling liners, bushings, and other cylindrical members from pumps, machines, oil well pump tubing and bores, and other devices, it is particularly adapted for pulling valve seats from the valve deck of a pump.

A releasible tool according to the invention includes four basic components: a mandrel, a platform slidably mounted to the mandrel, at least two jaws are pivotally mounted to the platform, and an adaptor connected to the mandrel. The mandrel has a generally bell-shaped lower end and a shank portion. The platform has a central bore therethrough and an upwardly extending tapered surface. The platform is slidably mounted on the shank portion of the mandrel by placing the shank portion through the central bore of the platform. The jaw members are pivotally mounted to the platform, whereby they can be pivotally deflected outward to an expanded position by the bell-shaped lower end of the mandrel when the platform slides down the shank portion of the mandrel. The adaptor is releasably connected to the upper end of the shank portion of the mandrel. The adaptor has a downwardly extending tapered surface corresponding to the upwardly extending tapered surface of the platform. Thus, the upwardly and downwardly extending tapered surfaces can be engaged to form a releasable interference fit to grab and slide the platform upward on the shank portion of the mandrel, which moves the jaw members away from the bell-shaped lower end of the mandrel so that the jaw members can be pivotally deflected inward to a retracted position.

According to a further aspect of the invention, the releasable tool further includes a clutch device, whereby the upwardly extending tapered surface on the platform and the downwardly extending tapered surface on the adaptor can form an interference fit only when the clutch device is rotationally aligned. According to a presently most preferred embodiment of the invention, the clutch device preferably comprises an aperture formed in the platform and a downwardly extending pin or post formed on the adaptor. The pin or post prevents engagement of the upwardly and downwardly extending tapered surfaces on the platform and adaptor, respectively, except when the pin or post is rotationally aligned with the aperture so that it can be received by the aperture, thereby allowing engagement of the upwardly and downwardly extending tapered surfaces.

According to another aspect of the invention, each of the jaw members of a releasable tool has a leg portion and a lip portion. The lip portion has an inclined surface on the lower side thereof, whereby as the releasable tool is lowered to a cylindrical member, an upper surface of the cylindrical member engages this inclined surface of the jaw member, thereby arresting the downward movement of the platform, which slides on the shank portion of said mandrel until the bell-shaped lower end of the mandrel moves below the jaw members and they can be deflected inward toward a collapsed position. In the collapsed position the said jaw members can pass through the bore of a cylindrical member to be removed from a pump, machine, well tubing, or other device.

According to yet another aspect of the invention, the platform of the releasable tool has a lower surface adapted to come to rest on the upper surface of the cylindrical member, whereby the shank portion of the mandrel can slide down through the central bore of the platform and the bell-shaped end portion of the mandrel moves away from the jaw members until they become freely pivotally suspended in a collapsed position within the bore of the cylindrical member. This collapsed position in the bore of the cylindrical member can be useful in removing the tool from the cylindrical member.

According to still another aspect of the present invention, the leg portion of each of the jaw members has an inner curved surface adapted to closely conform to a portion of the bell-shaped lower end of the mandrel, whereby when the mandrel is raised, the shank portion slides upward through the central bore of the platform until the bell-shaped end portion engages the inner curved surfaces of the jaw members to pivotally deflect the jaw members to an expanded position. The closely conforming surfaces of the jaw members and the bell-shaped lower end of the mandrel allow a uniform lifting force to be transferred from the mandrel against the inner curved surfaces of the jaw members. This lifting force is uniformly distributed of a substantial surface area on the inner surface of the jaw members, which makes the removal tool stronger.

The adaptor of the releasable tool preferably has a threaded connector formed on the upper end thereof, whereby the adaptor is releasably screwed onto the movement arm of a jack or knocker for moving and operating the releasable tool.

According to yet another aspect of the present invention, a method is provided for attempting to remove a cylindrical member, such as a valve seat, pump liner, or bushing, from a pump, machine, or other device in which it is used. The method includes the following steps. At least two jaw members are pivotally mounted to a platform. The platform has a central bore therethrough. The platform is slid onto the shank portion of a mandrel by inserting the shank portion through the central bore of the platform. The mandrel has a generally bell-shaped lower end and a threaded upper end, whereby the platform slides down the shaft portion and the bell-shaped lower end of the mandrel pivotally deflects the jaw members to an expanded position. The lower end of an adaptor is screwed onto the threaded upper end of the mandrel, and the upper end of the adaptor is screwed onto a movement arm of a jack or knocker. The movement arm is lowered toward a cylindrical member to be removed from a pump, machine, or other device. When the jaw members strike an upper surface of the cylindrical member, the downward movement of the jaw members and platform are arrested while the bell-shaped lower end of the mandrel descends into the bore of the cylindrical member. When the bell-shaped lower end of the mandrel has descended to the point the jaw members can pivotally swing into a collapsed position, they also descend into the bore of the cylindrical member. The platform slides downward on the shank of the mandrel until it rests on the upper surface of the cylindrical member. The movement arm can then be raised to outwardly deflect the jaw members so that they engage a lower face of the cylindrical member. Finally, the movement arm is used to apply lifting and knocking forces to the tool in an attempt to remove the cylindrical member from the pump, machine, or other device in which it is used.

According to a further aspect of the method of the invention, the removal tool can be released from the cylindrical member if the member refuses to budge from its position. According to this further aspect, the movement arm is lowered until the platform rests on the upper surface of the cylindrical member and the shaft portion of the mandrel slides through the central bore of the platform until the bell-shaped lower end of the mandrel disengages from the jaw members so that the jaw members pivot toward a collapsed position that disengages the jaw members from the cylindrical member and until a downwardly extending post on the adaptor contacts an upper surface of the platform. The movement arm is then rotated, which rotates the adaptor until a downwardly extending post on the adaptor is aligned with an aperture in the upper surface of the platform. The movement arm is then lowered so that the post of the adaptor descends into the aperture in the upper surface of the platform and a tapered surface of the adaptor mates with a similarly tapered surface of the platform in an interference fit, which releasably retains the platform at an elevated position on the shank portion of the mandrel. Finally, the movement arm is raised, which removes the platform, the collapsed jaw members, and the mandrel from the cylindrical member.

Accordingly, it is an object and purpose of the present invention to provide a releasable tool for removing valve seats, pump liners, bushings, and other cylindrical members from machines, pumps, or other devices in which they are used. It is another object and purpose of the present invention to provide a releasable tool particularly adapted for removing a valve seat from a fluid pump. Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. The various advantages, features, methods, and uses of the present invention will be apparent from a consideration of written description and the following drawings.

DETAILED DESCRIPTION OF PREFERRED EMBODIMENTS OF THE INVENTION

Figure 1:
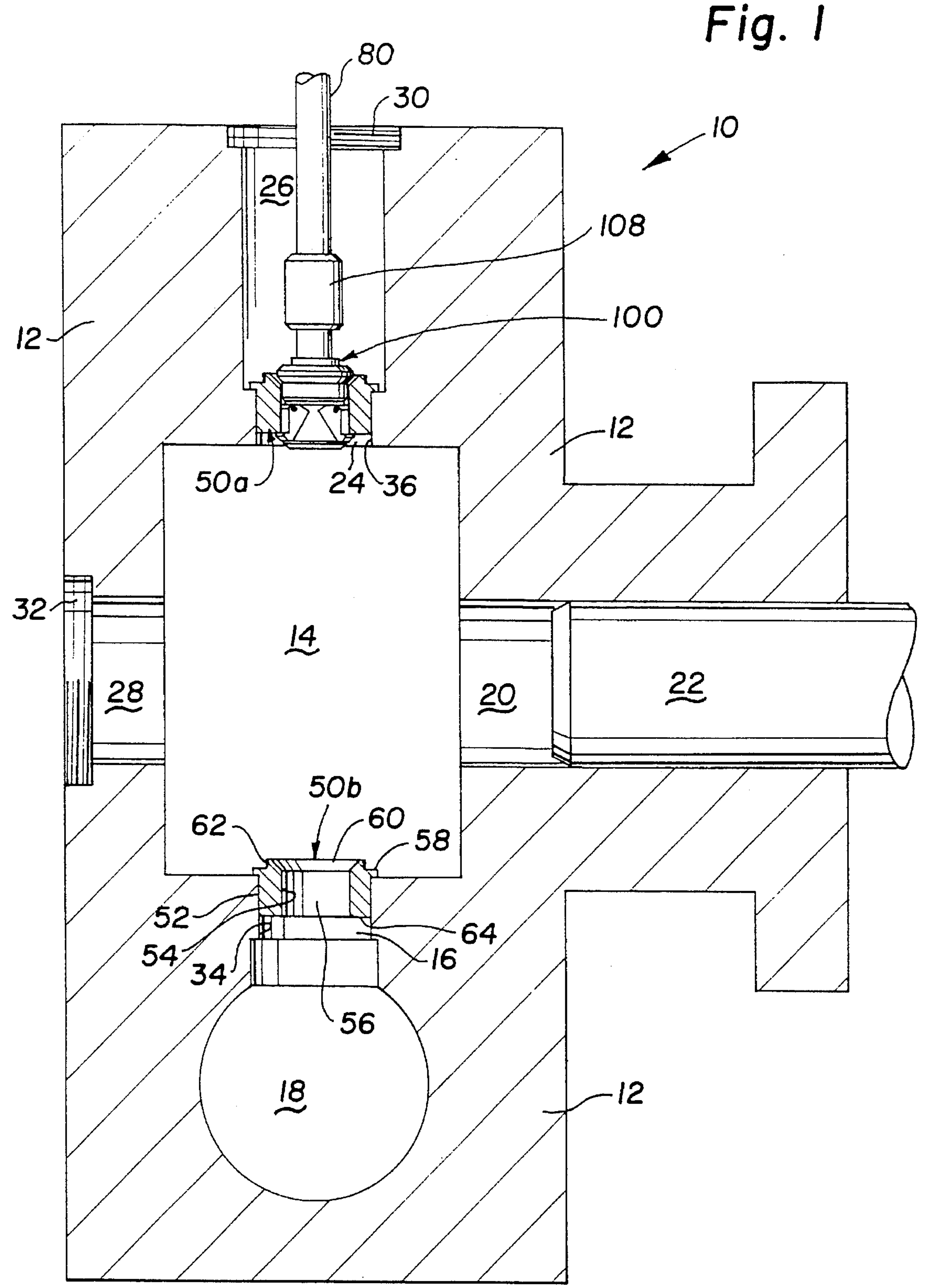
FIG. 1 is a cross section of a heavy industrial fluid pump having a pump body defining a pumping chamber with a suction port, plunger port, and discharge port, which shows a valve seat removal tool according to the present invention positioned to remove the valve seat of the discharge port.

Referring to FIG. 1 of the drawing, the cross-section of a typical fluid pump, generally referred to by the reference numeral 10 is illustrated. Fluid pump 10 has a pump body 12 defining a pumping chamber 14 having a suction port 16, which provides fluid communication between the pumping chamber 14 and a low pressure side 18 of the pump 10, a plunger port 20 for a reciprocating plunger 22, and a discharge port 24, which provides fluid communication between the pumping chamber 14 and a high pressure side 26 of the pump 10. The fluid pump 10 also commonly has a service port 28.

The fluid pump 10 shown in FIG. 1 is shown partially disassembled for servicing. The high pressure side 26 of the pump 10 has an end that opens to the exterior of the pump 10. The open end of the high pressure side 26 has a female threaded portion 30 so that a correspondingly threaded service port cover or plug (not shown) can be screwed into position to seal the open end of the high pressure side 26 of the pump 10. The service port 28 has an end that opens to the exterior of the pump 10. The open end of the service port 28 has a female threaded portion 32 so that a correspondingly threaded service port cover or plug (not shown) can be screwed into position to seal the open end of service port 28. During normal operation of the pump 10, the high pressure side 26 and the service port 28 are each closed with service cover or plug. In FIG. 1, however, the high pressure side 26 of the pump 10 is shown with its service cover removed, which provides service access to the interior of high pressure side 26 and the discharge port 24. Service port 28 is also shown with its service cover removed, which provides service access to the interior of pumping chamber 14 and the suction port 16.

During normal operation of the pump 10, a suction valve is positioned in the suction port 16 and a discharge valve is positioned in the discharge port 24. The suction valve is a spring-loaded check valve for allowing the flow of fluid from the low pressure side 18 of the pump 10 through the suction port 16 into the pumping chamber 14 while preventing the backflow of fluid through the suction port 16. The discharge valve is a spring-loaded check valve for allowing the flow of fluid from the pumping chamber 14 through the discharge port 24 to the high pressure side 26 of the pump 10 while preventing the backflow of fluid through the discharge port 24.

Suction port 16 is generally cylindrical in shape, being defined by slightly tapered inner cylindrical wall 34. Discharge port 24 is generally cylindrical in shape, being defined by a slightly tapered inner cylindrical wall 36. The size and shape of suction port 16 and discharge port 24 are preferably identical for the purpose of receiving identical valve seats for spring-loaded check valves.

The partially disassembled pump 10 is shown having a valve seat 50*a* for a spring-loaded check valve positioned in the discharge port 24, and a valve seat 50*b* for a spring-loaded check valve positioned in the suction port 16. The valve seats 50*a* and 50*b* are of identical construction. As best shown in FIG. 1 with respect to the suction port 16, the valve seat 50*b* has a generally cylindrical configuration with an outer cylindrical wall 52 and an inner cylindrical wall 54. (For clarity of the drawing, reference numerals for valve seat 50*a* are not placed on the drawing.) The valve seat 50*b* is symmetrical about a central axis. The inner cylindrical wall 54 defines a central bore 56 extending axially through the generally cylindrical valve seat 50*b*. The outer cylindrical wall 52 of valve seat 50*b* is slightly tapered (male), which mates with a similarly tapered inner surface 34 (female) of the suction port 16 in an interference fit. The upper end of the valve seat 50*b* has a circumferential flange or lip 58, which provides a mechanical stop for the interference fit of the valve seat 50*b* in the suction port 16.

Typically, the axes of valves seats 50*a* and 50*b* are vertically disposed in the pump 10 as shown, and most preferably the vertical axes of the valve seats 50*a* and 50*b* are co-axially aligned. In this most preferred configuration, once the valve seat 50*a* is removed, a valve seat removal tool can reach through the discharge port 24 to dislodge the valve seat 50*b* in the suction port 16. Once dislodged from the suction port 16, the valve seat 50*b* can be removed through the service port 28.

The upper end of the valve seat 50*b* has a frusto-conical seat portion defined by a circumferential outwardly inclined wall 60. The angle of the inclined wall 60 is preferably about 45 degrees to the vertical. The seat portion of the valve seat 50*b* provides a mechanical stop and seal for a valve element having correspondingly shaped flange. The piston of the valve element is of a size to reciprocate in the bore 56 of the valve seat 50*b*.

The upper end of the valve seat 50*b* has exposed male threads 62 above the circumferential lip 58. Thereby, a cage (not shown) having a generally dome-like shape having corresponding female threads on the periphery thereof is threaded onto the threads valve seat 50*b*. The cage captures a spring against the upper flanged surface of a valve element adjacent the valve seat 50*a*, whereby the valve element is spring-loaded in a normally closed position. During operation of the pump, the spring-loaded valve element moves against the spring to open the check valve and allow fluid to pass therethrough in response to a pressure differential sufficient to overcome the retaining force of the spring on the valve element. In FIG. 1, however, the pump 10 is shown disassembled with only the valve seats 50*a* and 50*b* remaining wedged in position in the discharge port 24 and suction port 16, respectively.

The lower end of the valve seat 50*b* has a circumferential flat surface or lower face 64. As will hereinafter be explained in detail, this lower face 64 is used by a valve removing tool to provide a lifting force on the valve seat 50*b*.

The plunger 22 is positioned to reciprocate back and forth in the plunger port 18 of the pump 10. During operation of the pump 10, the back stroke of the plunger 22 increases the effective volume of the pumping chamber 14 to create suction, which opens the suction valve in the suction port to draw fluid into the pumping chamber. During the forward stroke of the plunger, the decreasing effective volume of the pumping chamber 14 creates increasing fluid pressure, which closes the suction valve and opens the discharge valve in the discharge port to pump fluid through the discharge valve to the high pressure side of the pump 10.

Figure 2:
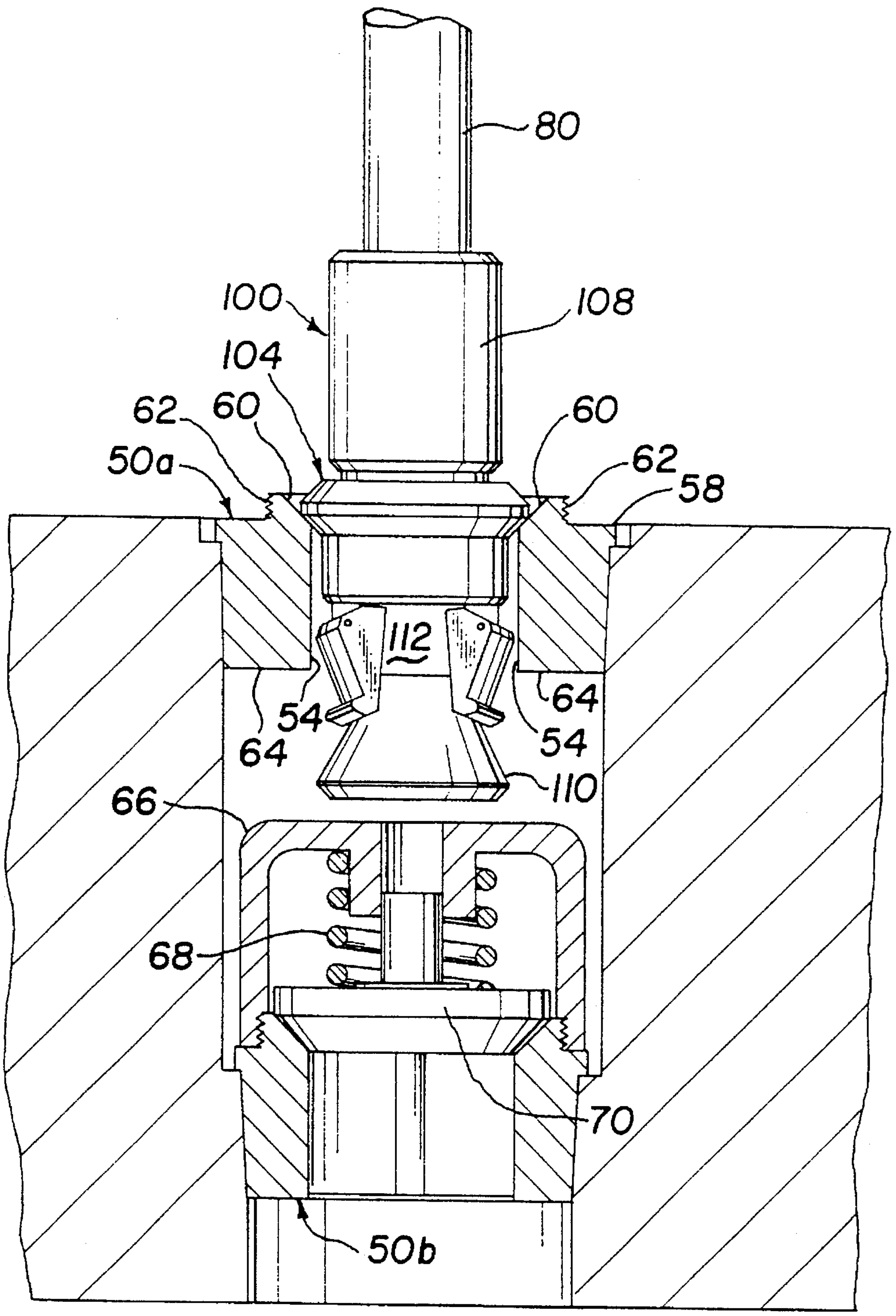
FIG. 2 is a cross section of a different pump in which the valve seats are located such that the lower valve seat cannot be removed until the upper valve seat is removed and showing the small clearance between the upper valve seat and the lower valve assembly.

Referring now to FIG. 2 of the drawing, a different valve seat arrangement is illustrated, wherein the valve seats 50*a* and 50*b* are positioned vertically one above the other, but there is no side access port to reach the lower spring-loaded check valve. As shown in FIG. 2, wherein like parts are numbered the same as in FIG. 1, it can be seen that the cage 66 that captures spring 68 and valve element 70 in valve seat 50*b* cannot be removed until the valve seat 50*a* is removed. Furthermore, there may only be a small clearance space between the lower face 64 of valve seat 50*a* and the upper portion of the cage 66 mounted to lower valve seat 50*b* in which to work for removing the upper valve seat 50*a*.

As previously discussed, during operation of the pump 10, the valve seats 50*a* and 50*b* in the check valves become worn and must be periodically replaced. Particularly when pumps are used for materials containing mud, sand, or other gritty or abrading materials, as in oil wells, the wear upon the walls of the valve seat about the valve element is so rapid as to speedily render the pump unfit for service unless the surfaces of the valve seats are frequently renewed.

But during operation of the pump the hammering action of the spring-loaded valve element and the high pressures can wedge the valve seats 50*a* and 50*b* in an extremely tight interference fit with the inner surfaces 36 and 34, respectively, of the ports 16 and 24. Sometimes a valve seat becomes deformed and rusts in place. For these and additional reasons, a valve seat can become extremely difficult to remove.

Referring to both FIGS. 1 and 2 of the drawing, according to the presently most preferred embodiment of the present invention, a releasible valve seat removal tool, generally referred to by the reference numeral 100, is provided for removing the valve seats 50*a* and 50*b* from the pump body 12. As will hereinafter be described in detail, the releasible valve seat removal tool 100 is removably connected to the movement arm 80 of a mechanical or hydraulic jack or knocker (not shown).

Figure 4:
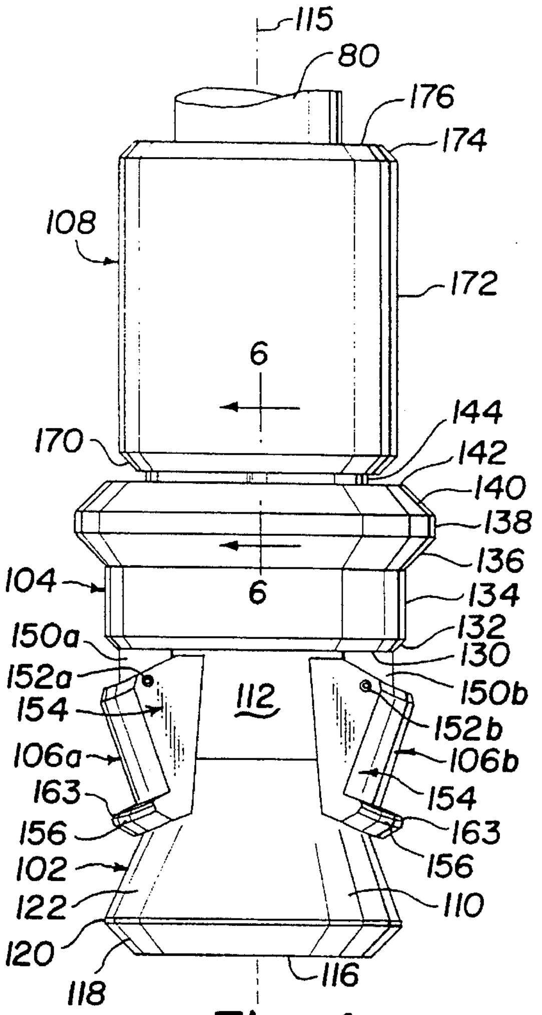
FIG. 4 is a side view of a valve seat removal tool according to the present invention wherein the tool is positioned with the jaws retracted whereby the tool can pass through the annular opening of a valve seat.
Figure 3:
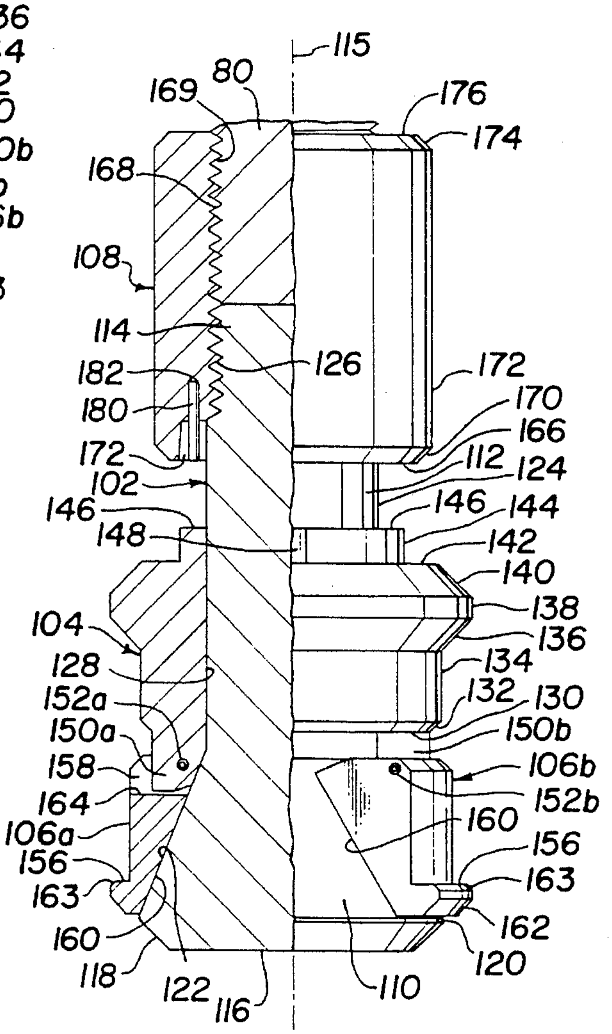
FIG. 3 is a partial cross-section side view of a valve seat removal tool according to the invention showing the tool positioned with the jaws forced outward by the bell-shaped portion of the mandrel whereby the lips of the jaws can engage the underside of a valve seat and the tools can force the valve seat from the port of a pump.

Referring now to FIGS. 3–4 of the drawing, the removal tool 100 has four basic components: a mandrel 102, a platform 104 slidably mounted to the mandrel 102, at least two jaws 106a and 106b pivotally mounted to the platform 104, and an adaptor 108 connected to the mandrel 102. The structure and cooperation of these components will be described in detail with reference to FIGS. 3–6.

The mandrel 102 has a generally bell-shaped lower end 110, a shank portion 112, and a threaded upper end 114. The mandrel 102 is preferably symmetrical about a vertical central axis 115. The mandrel 102 is preferably integrally formed to be a solid body of durable metal, such as steel.

The bell-shaped lower end 110 of mandrel 102 preferably has a flat, circular bottom surface 116, an outwardly inclined circumferential surface 118 extending from the periphery of the bottom surface 116 to a short cylindrical surface 120, and an relatively large, inwardly inclined circumferential surface 122 extending from the cylindrical surface 120 to the shank portion 112. Thus, the surface 122 is a frusto-conical surface for engaging and expanding the pivotally mounted jaws 106*a* and 106*b* as will hereinafter be described in more detail. (For convenience of description, the relative terms such as "bottom," "top," "upwardly" and "downwardly" are taken with respect to the vertical orientation of the central axis 115. Similarly, the relative terms "inwardly" and "outwardly" are taken from the perspective of a person looking upwardly along the central axis 115.)

The portion of the mandrel 102 extending below the cylindrical surface 120 and defined by the bottom surface 116 and inclined circumferential surface 118 provides additional structural strength to the mandrel. As will hereinafter be explained in detail, the bottom surface 116 also provides a striking area to help disengage the removal tool 100.

The largest diameter of the mandrel 102 is at the short cylindrical surface 120, and referring briefly back to FIGS. 1 and 2 of the drawing, this diameter is designed to fit with a small annular clearance within the bore 56 of a valve seat 50*a* or 50*b*. Continuing to refer to FIGS. 3 and 4, the outwardly inclined circumferential surface 118 is most preferably inclined at an angle of about 45 degrees to the vertical axis 115. This angle is selected for the purpose of assisting the directing the removal tool 100 toward the center of a bore in case it is not properly aligned in the center of the bore 56. The inwardly inclined circumferential surface 122 of the bell-shaped lower end 110 is most preferably inclined at an angle of about 22 degrees to the vertical axis 115.

The shank portion 112 has a cylindrical wall 124. The length of the shank portion 112 is preferably relatively short so that the tool 100 can be operated in tight spaces such as illustrated in FIG. 2 of the drawing. The diameter of the shank portion 112 is about one half the diameter of the short cylindrical surface 120.

The threaded upper end 114 of the mandrel 102 is integrally formed on the shank portion 112. Male threads 126 are machined on the upper end of the shank 112 so that the diameter of the threaded upper end 114 of the mandrel 102 is the same as that of the shank 112.

Figure 5:
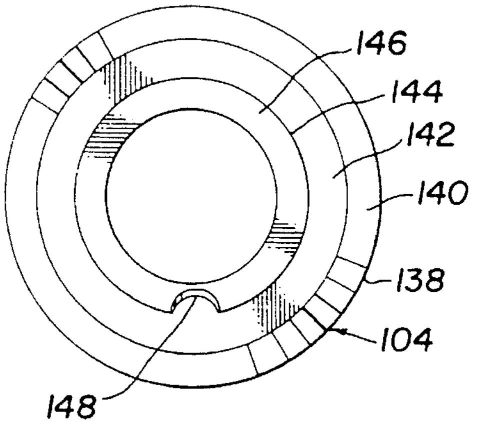
FIG. 5 is a top plan view of the platform of the valve seat removal tool illustrated in FIGS. 1–4.

The platform 104 has a generally cylindrical shape. The platform 104 is preferably formed to be a solid body of durable metal, such as steel. An inner cylindrical surface 128 defines an axial platform bore. As will hereinafter be explained in detail, this axial platform bore is designed to accommodate the shank portion 112 of the mandrel 102, whereby the platform 104 can freely slide along the length of the shank 112. The platform 104 has a flat, circular bottom surface 130 with the axial platform bore extending therethrough. The generally cylindrical platform 104 has a profiled outer surface, which in the presently most preferred embodiment of the invention from the periphery of the bottom surface 130 of the platform to the top includes: a first outwardly inclined surface 132, a first vertical cylindrical surface 134, a second outwardly inclined surface 136, a second vertical cylindrical surface 138, an inwardly inclined surface 140; a horizontally extending surface 142; and slightly inwardly tapered surface 144 (male). As best shown in FIGS. 3 and 5, the platform 104 has a flat, circumferential top surface 146 with the axial platform bore extending therethrough. According to the most preferred embodiment, the first outwardly inclined surface 132, the second outwardly inclined surface 136, and the inwardly inclined surface 140 are all inclined at an angle of about 45 degrees to the vertical axis 115. The first outwardly inclined surface 136 is particularly adapted to mate with the upper circumferential seat portion 60 of a valve seat such as 50*a* or 50*b*, whereby the platform 104 can rest and be supported on the seat portion 60. The first cylindrical surface 134 has a diameter that is about the same as the largest diameter of the mandrel 102 at cylindrical surface 120, whereby the portion of the platform 104 extending lower than the second outwardly inclined surface 136 is designed to fit with a small annular clearance within the bore 56 of a valve seat 50*a*, 50*b*. As will hereinafter be explained in more detail, the portion of the platform 104 defined by the tapered surface 144 and top surface 146 has a small cutout or notch 148 adapted for receiving a properly oriented downwardly extending pin or small post.

Welded or otherwise formed on the bottom surface 130 of the platform 104 at diametrically opposed locations are two downwardly extending lugs 150*a* and 150*b*. Each lug 150*a*, 150*b* has journaled openings through which pivot connectors or pins 152*a* and 152*b*, respectively, can be positioned to provide a pivotal mounting for the jaws 106*a* and 106*b*.

According to the presently most preferred embodiment of the invention, there are two jaws 106*a* and 106*b*, however, it is to be understood that the more, smaller jaws could be used if desired. The jaws 106*a* and 106*b* are preferably integrally formed to be a solid body of durable metal, such as steel. Each of the jaws 106*a* and 106*b* preferably has the same structure, which basically includes a leg portion 154 and a lip portion 156.

As best shown in FIG. 3 of the drawing, the upper end of leg portion 154 preferably has a slot-like opening 158 formed therein adapted to receive one of the downwardly extending lugs 150*a* or 150*b*. A journalled opening is formed in the upper end of the leg portion 154 to aligned with the journaled opening of one of the lugs 150*a* or 150*b*, whereby when the journaled openings are aligned, a pivot connector or pin 152*a* or 152*b* can be positioned therethrough to pivotally mount the jaw 106*a* or 106*b* to the platform 104. The leg portion 154 has an inner curved surface 160 adapted to closely conform to a portion of the frusto-conical surface 122 of the bell-shaped lower end 110 of mandrel 102.

The lip portion 156 is arcuately extending for engaging the lower face 64 of a valve seat 50*a*, 50*b* and setting the tool 100 in the valve seat. The lip portion 156 has an outwardly inclined arcuate surface 162. As best shown in FIG. 3, the angle of surface 162 is selected to be about 45 degrees to the vertical axis 115 when the jaws 106*a* and 106*b* are fully expanded by the bell-shaped portion 110 of the mandrel 102. If the jaws strike a ledge or other feature as the tool moves downwardly into the pump body 12, this inclined angle of surface 162 tends to deflect the jaws 106*a* and 106*b* inwardly, thereby reducing the likelihood that the jaws hang up on a ledge or other feature in the pump body.

The lip portion 156 also preferably has an inwardly inclined arcuate surface 163. As best shown in FIG. 3, the angle of surface 163 is selected to be about 45 degrees to the vertical axis 115 when the jaws 106*a* and 106*b* are fully expanded by the bell-shaped portion 110 of the mandrel 102. When the jaws are hanging free of the mandrel 102 and the tool 100 is being lifted, if the lip portion 156 strikes a ledge, such as the lower face 64 of the valve seat 50*a* or 50*b*, then this surface 163 tends to deflect the jaws 106*a* and 106*b* inwardly toward a retracted position so that they can pass through the bore 56 of the valve seat without setting the tool 100, whereby the tool can be selectively removed from the valve seat without removing the valve seat from the pump 10.

As shown in FIG. 4 of the drawing, when the surface 136 of the platform 104 rests on the seat portion 60 of a valve seat 50*a*, 50*b*, the shank portion 112 of the mandrel 102 slides through the platform bore so that the bell-shaped end 110 of the mandrel is lower than the jaws 106*a* and 106*b*. According to one preferred embodiment of the invention, the jaws 106*a* and 106*b* are pivotally mounted on the lugs 150*a* and 150*b*, respectively, so that they are neutrally balanced, that is, they can be pivotally deflected between a collapsed position and an expanded position, or vice-versa, but they do not naturally swing one way or the other. According to another preferred embodiment of the invention, the jaws 106*a* and 106*b* are pivotally mounted on the lugs 150*a* and 150*b*, respectively, of the platform 104 so that they have a tendency to naturally swing in toward each other about pivot connections 152*a* and 152*b* when hanging free of the frusto-conical surface 122.

As shown in FIG. 3 of the drawing, when the platform 104 is not supported, it slides downward on the shank portion 112 of the mandrel 102 to where the bell-shaped end 110 of the mandrel supports the jaws in an expanded position. The lower surface of lug 150*a*, 150*b* acts as a mechanical stop against the bottom surface 164 of the slot-like opening, thereby defining the limit of pivotal expansion of the jaws 106*a*, 106*b*.

The adaptor 108 of the valve seat removal tool 100 has a generally cylindrical body with an axial female threaded bore extending therethrough. The adaptor 108 is preferably formed to be a solid body of durable metal, such as steel. The adaptor 108 has a flat, circular bottom surface 166 with a circular opening for the threaded bore. The axial bore has female threads 168 corresponding to the male threads 126 on the mandrel 102, whereby the mandrel 102 can be threaded into the female threads 168 at the lower end of the adaptor 108, thereby capturing the platform 104 on the shank 112 between the bell-shaped lower end 110 and the adaptor 108. The female threads 168 at the upper end of the axial threaded bore are used to engage the valve seat removal tool 100 to a movement arm 80 of a typical jacking device or knocker (not shown). The end of the movement arm 80 has male threads 169 formed thereon corresponding to the female threads 168 of the adaptor 108. The adaptor 108 has a outwardly inclined surface 170 extending from the periphery of the bottom surface 166, a vertical cylindrical surface 172, and an inwardly inclined surface 174. The adaptor 108 has a flat, circular top surface 176 with a circular opening for the female threaded axial bore. According to the presently most preferred embodiment, the outwardly inclined surface 170 and the inwardly inclined surface 174 of the adaptor 108 are inclined at an angle of about 45 degrees to the vertical central axis 115. The purpose of these inclined surfaces 170 and 174 is to reduce the profile ledges on the adaptor 108, thereby reducing the likelihood that the adaptor might become hung on a projection or feature inside the pump body 12.

Figure 6:
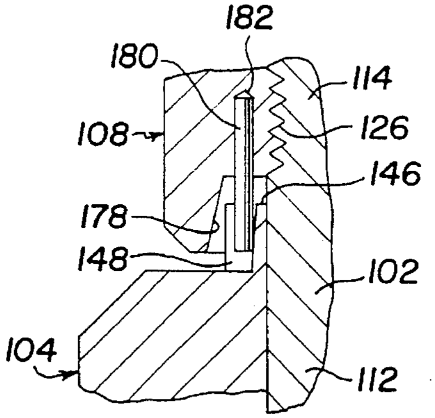
FIG. 6 is a cross-section detail of the roll pin portion of the valve seat removal tool taken along lines 6—6 of FIG. 4.

As best shown in FIG. 6 of the drawing, the lower end of adaptor 108 has an enlarged circular opening defined by a slightly inwardly tapered surface 178 (female) at the lower end thereof. This tapered surface 178 is concentric with the axial threaded bore through the adaptor 108 and is adapted to receive the slightly inwardly tapered surface 144 (male) of the platform 104 to create an interference fit between the platform 104 and adaptor 108.

According to another aspect of the invention, the removal tool 100 also has a clutch device that prevent engagement of tapered surface 144 (male) and tapered surface 178 (female) except when the clutch members are rotationally aligned in a particular position, thereby allowing engagement of the tapered surfaces 144 and 178 in an interference fit. According to the presently most preferred embodiment of the invention, the clutch device includes the following structures. The adaptor 108 also has a roll pin or post 180 that is glued or otherwise bonded in a small tap 182 drilled in the body of adaptor 108. Thus, the inwardly tapered surface 178 (female) of the adaptor 108 can only receive the inwardly tapered surface 144 (male) of the platform 104 when the post 180 is rotationally aligned with the notch 148 formed in the platform 104, which is described above. If the post 180 is not rotationally aligned with the notch 148, when the platform 104 slides up the shank portion 112 of the mandrel 102, the lower end of the post 180 hits the circumferential top surface 146 of the platform 104 and prevents the interference fit between the platform 104 and adaptor 108. Thereby, the co-acting adaptor 108 and platform 104 form a releasable latch arrangement resembling a clutch device.

To use the valve seat removal tool 100, it is assembled as shown in FIGS. 3 and 4 of the drawing. The platform 104 is positioned above the threaded upper end 114 of mandrel 102, and the upper threaded end 114 is inserted through the platform bore so that the platform 104 slides down the shank portion 112 under the force of gravity and its own weight. Once slidably mounted on the shank portion 112 of the mandrel 102, the frusto-conical surface 122 of the bell-shaped lower end 110 of the mandrel 102 causes the jaws 106*a* and 106*b* to pivotally expand about pivot pins 152*a* and 152*b*, respectively into the position shown in FIG. 3. The bottom surface 164 of slot-like opening 158 formed in the jaws 106*a* and 106*b* stops the further downward movement of the platform 104 and any further expansion of the jaws 106*a* and 106*b*. Since the curved inner surfaces 160 of the jaws 106*a* and 106*b* closely conforms to the curvature of the frusto-conical shape of surface 122, the surface 122 provides a uniform distribution of upward force against the jaws 106*a* and 106*b*. The male threads 126 formed on the threaded upper end 114 of mandrel 102 are screwed into the corresponding female threads 168 formed in the bore of the adaptor 108, thereby securing the adaptor 108 to the mandrel 102 and capturing the platform 104 and jaws 106*a* and 106*b* between the bell-shaped lower end 110 of the mandrel 102 and the lower end of the adaptor 108.

The valve seat removal tool 100 is then removably connected to the movement arm 80 of a jack or knocking device (not shown) by screwing the male threads 169 formed on the lower end of movement arm 80 into the female threads 168 formed in the bore of the adaptor 108.

Referring back to FIG. 1 of the drawing, the movement arm 80 is then used to lower the valve seat removal tool 100 through the high pressure side 26 of the pump 10 to the discharge port 24. As the tool 100 is lowered, the platform 104 and jaws 106*a* and 106*b* are in the position shown in FIG. 3 of the drawing. When the tool 100 reaches the valve seat 50*a*, the inclined surface 118 of the bell-shaped portion 110 may hit the seat portion 60 of the valve seat 50*a*. In response, the inclined surface 118 helps deflect the tool 100 such that the axis 115 of the tool become closely aligned with the axis of the valve seat 50*a*.

As best shown in FIG. 2, once the surface 118 is lowered just past the seat portion 60 of the valve seat 50*a* into the bore 56, the inclined arcuate surface 162 of jaws 106*a* and 106*b* engages the seat portion 60 of valve seat 50*a*, momentarily stopping the downward movement of the platform 104 and jaws 106*a* and 106*b*. As the valve seat removal tool 100 continues to be lowered, the mandrel 102 is lowered into the bore 56 and the seat portion 60 of the valve seat 50*a* tends to pivotally deflect the jaws 106*a* and 106*b* inwardly. But the jaws 106*a* and 106*b* cannot be deflected inward or move into the bore 56 of the valve seat 50*a* until the bell-shaped end portion 110 of the mandrel 102 moves further down into the bore 56 while the shank portion 112 slides through the bore of arrested platform 104. As this occurs, the platform 104 and jaws 106*a* and 106*b* are moved toward the position illustrated in FIGS. 2 and 4 of the drawing. In this position, the pivotally collapsed jaws 106*a* and 106*b* can then slide into and through the bore 56 of the valve seat 50*a*.

Once the lip portion 156 of jaws 106*a* and 106*b* passes the lower face 64 of the valve seat 50*a*, the jaws 106*a* and 106*b* can be pivotally deflected outwardly by the bell-shaped portion 110 of the mandrel 102. The second outwardly inclined surface 136 of platform 104 rests on the seat portion 60 of the valve seat 50*a*. Thus, as best shown in FIG. 2, the lip portion 156 engages the lower face 64 of the valve seat 50*a*. The movement arm 80 can then be raised until the frusto-conical surface 122 of the bell-shaped lower end 110 of the mandrel 102 engages the inner curved surfaces 160 of the jaws 106*a* and 106*b*, thereby pivotally expanding the jaws and setting the tool 100 in the valve seat 50*a* or 50*b*. This expanded position is shown in FIGS. 1 and 3. The curved outer surface of the leg portion 154 of expanded jaws 106*a* and 106*b* engages the inner surface 54 of the valve seat 50*a*, 50*b*. The close engagement of these surfaces provides a uniform distribution of lifting force that can be used to strongly lift or upwardly knock the valve seat 50*a* in an attempt to dislodge and remove it from the interference fit with the discharge port 24. There is a small clearance in the journaled openings for pivot pins 152*a* and 152*b*, on the order of about 15 thousands of an inch, which allows for the slight horizontal expansion of the pivotally mounted jaws about the pivots to create an extremely tight fit with the valve seat. As a lifting force is applied to the bell-shaped portion 110 of mandrel 102, the leg portion 154 of the jaws 106*a* and 106*b* exerts a tremendous internal pressure against the inner surface 54 of the valve seat. This tremendous internal pressure actually tends to expand the valve seat so that it physically cannot fit within the body of the pump, which tends to force or "pop" the valve seat out of its interference fit with the pump body. In most cases, the lifting and knocking forces applied through the movement arm 80 and the tool 100 to the valve seat 50*a* will be sufficient to dislodge the valve seat, in which case it is lifted with the tool 100 out of the discharge port 24.

The removal tool 100 then reaches through the discharge port 24 and the pumping chamber 14 to access the valve seat 50*b* in the suction port 16. The same procedure is used to dislodge the valve seat 50*b*, after which it can be removed through the service port 28.

But if the valve seat removal tool 100 has been set within a valve seat, such as valve seat 50*a* as shown in FIG. 1, and after great effort it is found that the valve seat cannot be dislodged with the tool 100, the removal tool 100 according to the present invention can be operated to release the tool from the valve seat so that it can be withdrawn from the pump 10 without the valve seat. In such a case, the movement arm 80 is lowered until the post 180 of the adaptor 108 contacts the top surface 146 of platform 104. This action extends the bell-shaped portion 110 of the mandrel 102 away from the jaws 106*a* and 106*b*, whereby the jaws naturally pivot from engagement with the lower face 64 of the valve seat 50*a*. Accordingly, the load has been removed from the jaws 106*a* and 106*b* so that they pivotally retract and thereby are released from the lower surface of the valve seat 50*a*. While pressing the movement arm 80 downward, it is manually rotated about the central axis 115 until the post 180 of the adaptor 108 aligns with the notch 148 formed in the platform 104, at which point the pin 180 descends into the notch 148. This allows the tapered surface 178 (female) of adaptor 108 to drop into engagement with the tapered surface 144 (male) of the platform 104 to form a releasable interference fit between the adaptor 108 and platform 104. This interference fit engagement between the adaptor 108 and platform 104 is shown in FIGS. 3 and 6 of the drawing. In this configuration, the platform 104 is releasably retained at an elevated position on the shank portion 112 of the mandrel 102, whereby the jaws 106*a* and 106*b* hang free of the frusto-conical surface 122 of the bell-shaped end 110 of mandrel 102. The retracted position of the jaws 106*a* and 106*b* shown in FIG. 4 reduces the profile of the tool 100, particularly the position of the lip portions 156 of the jaws 106*a* and 106*b* so that they can be pulled through the bore 56 of the valve seat 50*a*. Thus, upwardly away from the valve seat 50*a*, which action retrieves the tool 100 from the interior of the valve seat since the jaws have gravitated into the retracted position.

To disengage the interference fit between the adaptor 108 and platform 104, it is sometimes desirable to use the bottom surface 116 of the mandrel 102 as a striking area. Striking the bottom surface 116 can jar loose the interference fit between the adaptor 108 and platform 104. The portion of the mandrel 102 defined by the bottom surface 116 and inclined surface 118 provides a structural body that resists deformation of the bell-shaped lower end 110 of the mandrel 102.

This unexpected and desirable result is possible due to judicious selection of gravity of the jaws 106*a* and 106*b* respective to the pivot pins 152*a* and 152*b*, respectively, wherein the jaws always pivot towards one another and thus into the retracted position when the tool is held vertical. Since almost all pump valves are installed vertically, this action retracts the jaws 106*a* and 106*b* and the tool 100 can be easily telescoped out of the valve seat 50*a*. According to another aspect of the invention, the releasable interference fit between surfaces 144 and 178 of the platform 104 and adaptor 108, respectively, provides a releasable connector for selectively raising said platform relative to the bell-shaped lower end 110 of the mandrel 102, whereby the jaws 106*a* and 106*b* can naturally pivot to a retracted position to remove the tool 100 from the valve seat 50*a*. According to a further aspect of this invention, an unexpected and desirable result is also due to the cooperative action of clutch members, such as the post 180 of the adaptor 108 and the notch 148 of the platform 104, whereupon the platform 104 can only become releasably connected to the adaptor 108 by an interference fit when the clutch members are properly rotated in an aligned position.

Although the invention has described with reference to these preferred embodiments, other embodiments can achieve the same results. Variations and modifications of the present invention will be apparent to those skilled in the art without departing from the scope and spirit of the invention, and it is intended to cover in the appended claims all such modifications and equivalents.

Having described the invention, what is claimed is:

1. A releasible tool for removing a cylindrical member with a bore therethrough such as a valve seat, a pump liners, or a bushing from machines, pumps, or other devices in which it is used, the releasable tool comprising:

(a) a mandrel having a generally bell-shaped lower end and a shank portion;

(b) a platform having a central bore therethrough and an upwardly extending tapered surface, said platform being slidably mounted on said shank portion of said mandrel by placing said shank portion through said central bore of said platform;

(c) at least two jaw members pivotally mounted to said platform, whereby they can be pivotally deflected outward to an expanded position by said bell-shaped lower end of said mandrel when said platform slides down said shank portion of said mandrel; and (d) an adaptor releasably connected to an upper end of said shank portion of said mandrel, said adaptor having a downwardly extending tapered surface corresponding to said upwardly extending tapered surface of said platform, whereby said upwardly and downwardly extending tapered surfaces can be engaged to form a releasable interference fit to grab and slide said platform upward on said shank portion, which moves said jaw members away from said bell-shaped lower end of said mandrel so that said jaw members can be deflected inward to a retracted position.

2. A releasable tool according to claim 1, wherein the releasable tool further comprises: a clutch device, whereby said upwardly extending tapered surface on said platform and said downwardly extending tapered surface on said adaptor can form an interference fit only when said clutch device is rotationally aligned.

3. A releasable tool according to claim 2, wherein said clutch device preferably comprises an aperture formed in said platform and a downwardly extending pin formed on said adaptor, said pin preventing engagement of said upwardly and downwardly extending tapered surfaces except when said pin is rotationally aligned with said aperture so that said pin can be received by said aperture, thereby allowing engagement of said upwardly and downwardly extending tapered surfaces.

4. A releasable tool according to claim 1, wherein each of said jaw members has a leg portion and a lip portion, said lip portion having an inclined surface, whereby as the releasable tool is lowered to a cylindrical member, an upper surface of the cylindrical member engages said inclined surface of said lip portion, thereby arresting the downward movement of said platform, which slides on said shank portion of said mandrel until said bell-shaped lower end of said mandrel passes below said jaw members and said jaw members can be deflected inward toward a collapsed position so that said jaw members can pass through such cylindrical member.

5. A releasable tool according to claim 4, wherein said platform has a lower surface adapted to come to rest on the upper surface of the cylindrical member, whereby said shank portion of said mandrel can slide down through said central bore of said platform and said bell-shaped end portion of said mandrel moves away from said jaw members until they become freely pivotally suspended in a collapsed position within the bore of the cylindrical member.

6. A releasable tool according to claim 1, wherein said leg portion of each of said jaw members has an inner curved surface adapted to closely conform to a portion of said bell-shaped lower end of said mandrel, whereby when said mandrel is raised, said shank portion slides upward through said central bore of said platform until said bell-shaped end portion engages said inner curved surfaces of said jaw members to pivotally deflect said jaw members to an expanded position and provide uniform lifting force against said inner curved surfaces of said jaw members.

7. A releasable tool according to claim 1, wherein said mandrel has male threads formed on an upper end thereof and wherein said adaptor has corresponding female threads formed on a lower end thereof, whereby said mandrel can be releasable connected to said adaptor.

8. A releasable tool according to claim 1, wherein said adaptor has a threaded connector formed on an upper end thereof, whereby said adaptor is releasably screwed onto the movement arm of a jack or knocker for moving and operating the releasable tool.

* * * * *